(12) United States Patent
Suzuki et al.

(10) Patent No.: US 6,882,073 B2
(45) Date of Patent: Apr. 19, 2005

(54) LINEAR TYPE ACTUATOR

(75) Inventors: Yuzuru Suzuki, Shizuoka-ken (JP); Sakae Fujitani, Shizuoka-ken (JP); Naoyuki Harada, Shizuoka-ken (JP); Kunitake Matsushita, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/961,853

(22) Filed: Oct. 8, 2004

(65) Prior Publication Data

US 2005/0046291 A1 Mar. 3, 2005

Related U.S. Application Data

(63) Continuation of application No. 09/973,858, filed on Oct. 10, 2001, now abandoned.

(30) Foreign Application Priority Data

Oct. 17, 2000 (JP) ........................................ 2000/315993

(51) Int. Cl.$^7$ ................................................ H02K 7/06
(52) U.S. Cl. ........................ 310/80; 29/598; 74/89.23; 74/89.34
(58) Field of Search .................. 310/42, 49 R, 310/80, 83, 251; 29/596, 598, 732; 74/89.23, 89.34

(56) References Cited

U.S. PATENT DOCUMENTS

| | | |
|---|---|---|
| 3,476,852 A | 11/1969 | Shattuck .................... 254/261 |
| 4,714,367 A | 12/1987 | Baus .......................... 403/104 |
| 4,859,394 A | 8/1989 | Benton et al. .............. 264/225 |
| 5,456,406 A | 10/1995 | Lemelson ................... 228/199 |
| 5,595,089 A | 1/1997 | Watanabe et al. .......... 74/89.34 |
| 5,829,119 A | 11/1998 | Matsushita et al. ........... 29/596 |
| 6,093,984 A | 7/2000 | Shiga et al. .................. 310/26 |
| 6,144,120 A | 11/2000 | Doi et al. ................. 310/49 R |
| 6,161,443 A | 12/2000 | Biesecker et al. ......... 74/89.23 |
| 6,286,804 B1 | 9/2001 | Avinger et al. ............. 248/523 |
| 6,464,421 B1 | 10/2002 | Kiefer ......................... 403/21 |
| 6,492,751 B1 | 12/2002 | Childs et al. ................. 310/71 |

*Primary Examiner*—Darren Schuberg
*Assistant Examiner*—Judson H. Jones
(74) *Attorney, Agent, or Firm*—Fay, Sharpe, Fagan, Minnich & McKee, LLP

(57) ABSTRACT

In order to reduce cost through reduction in material cost and improvement of productivity, in a linear type actuator comprising: a stator unit having coils consisting of wound magnet wires and housed inside stator sub-assemblies and pole teeth arranged on the inner circumference thereof; a rotor unit having a field magnet arranged on the outer circumference thereof and rotatably disposed so as to oppose the pole teeth with a given gap; an output shaft attached to a center portion of the rotor unit and movable in the axial direction thereof; and converting means provided on the innermost diametral circumferential surface of the rotor unit and adapted to convert rotary motion of the rotor unit into linear motion of the output shaft, the converting means is made of a material different from that of the rotor unit.

14 Claims, 4 Drawing Sheets

LINEAR TYPE ACTUATOR

This application is a continuation of patent application Ser. No. 09/973,858 which was filed on Oct. 10, 2001 now abandoned.

BACKGROUND OF THE INVENTION

1. Field of the Invention

The present invention relates to a linear type actuator, in which an output shaft is adapted to move linearly, and more particularly to a linear type actuator which can be manufactured with reduced cost through reduction in material cost and improvement in productivity.

2. Description of the Prior Art

In recent years, a direct drive is required for high performance in various apparatuses, and a linear type actuator has been employed for linear control.

FIG. 1A shows a longitudinal section of a conventional linear type actuator using a PM (permanent Magnet) stepping motor and FIG. 1B shows an enlarged view of a circled portion B of the linear type actuator shown in FIG. 1A.

Referring to FIGS. 1A and 1B, a rotor unit 50 is rotatably arranged inside a stator unit 40, a field magnet 51 is insert molded in the rotor unit 50, and a female screw 52 is formed on the innermost diametral circumferential surface of an insert molded resin portion 56. A male screw 62 is formed on an output shaft 60, and engages with the female screw 52. Due to an antirotation pin 31 preventing the output shaft 60 from rotating, the output shaft 60 is moved in an axial direction by the rotation of the rotor unit 50.

However, the conventional linear type actuator as above-mentioned has the following problems:

Since the female screw 52 is required to feature small coefficient of friction, high wear resistance and excellent dimensional stability, insert molding thereof requires a high-quality and therefore expensive resin material pushing up the cost. Furthermore, since its molding conditions include high temperature and high pressure, the workability of insert molding the female screw 52 together with the field magnet 51 is deteriorated and the insert molded product must be rotated to be removed for the purpose of forming the female screw 52. This inevitably complicates a mold and causes an increase in the number of man-hours, which makes it difficult to streamline parts and stabilize the quality of parts as well at the same time.

Further problem is that since the female screw 52 is formed at the time of producing the rotor unit 50, the productivity of the insert molding is poor, thereby increasing the number of man-hours.

SUMMARY OF THE INVENTION

The present invention was made considering the above problems, and it is an object of the present invention to provide a linear type actuator in which a rotor unit is manufactured by insert molding a nut serving as a motion converting means which plays an important part in linear type actuator, a field magnet and a magnet stopper, so as to reduce the material cost and improve the productivity, thereby achieving a cost reduction.

According to the present invention, in a linear type actuator comprising: a stator unit having coils consisting of wound magnet wires and housed inside stator sub-assemblies and pole teeth arranged on the inner circumference thereof; a rotor unit having a field magnet arranged on the outer circumference thereof and rotatably disposed so as to oppose the pole teeth with a given gap therebetween; an output shaft attached to a center portion of the rotor unit and movable in the axial direction thereof; and a nut as a motion converting means (hereinafter referred to as converting means) provided on the innermost diametral circumferential surface of the rotor unit and adapted to convert rotary motion of the rotor unit into linear motion of the output shaft, the converting means is made of a material different from that of the rotor unit.

The converting means is configured with a plurality of straight sides and has rounded corners thereof formed at joints of the sides.

The rotor unit is integrally constituted by insert molding the field magnet, magnet stoppers adapted to hold the field magnet and also to protect end corners thereof, and the converting means.

DETAILED DESCRIPTION OF THE PREFERRED EMBODIMENT

The present invention will now be described by reference to the accompanying drawings.

Figure 1A:
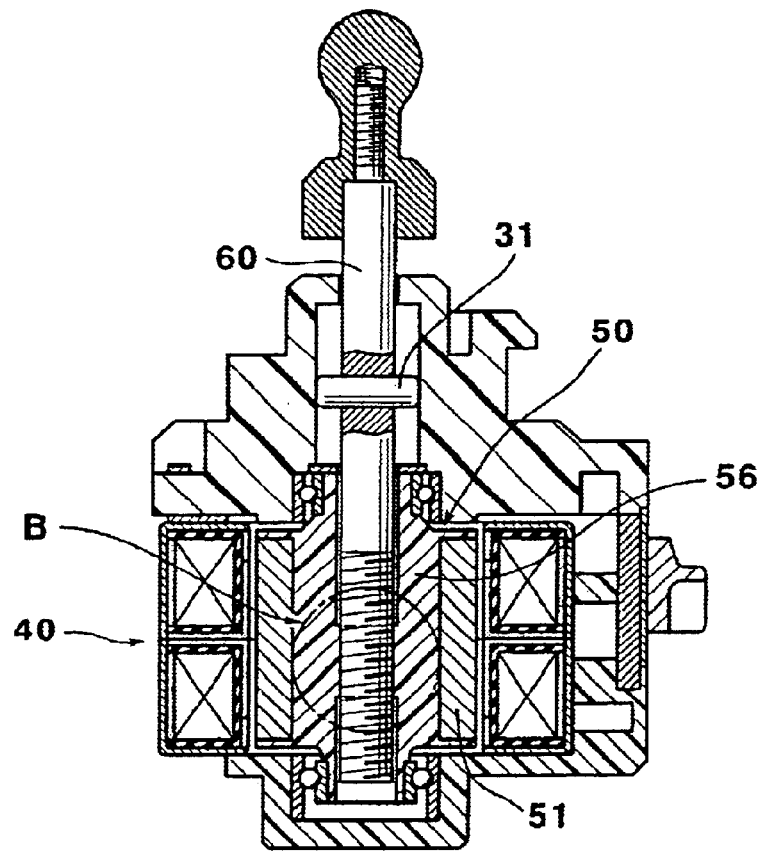
FIG. 1A shows a longitudinal sectional view of a conventional linear type actuator using a PM stepping motor.
Figure 1B:
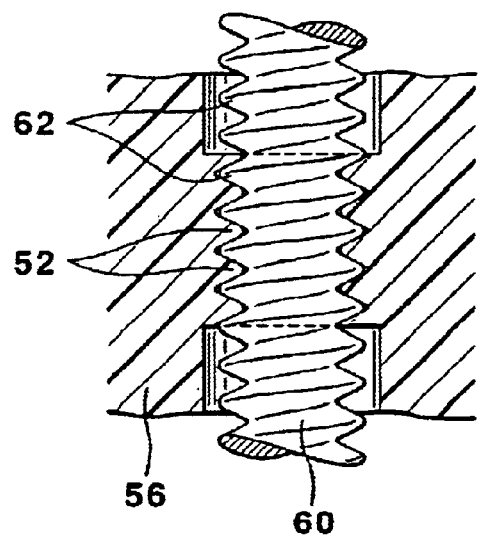
FIG. 1B shows an enlarged view of a circled portion B of the linear type actuator shown in FIG. 1A.
Figure 2A:
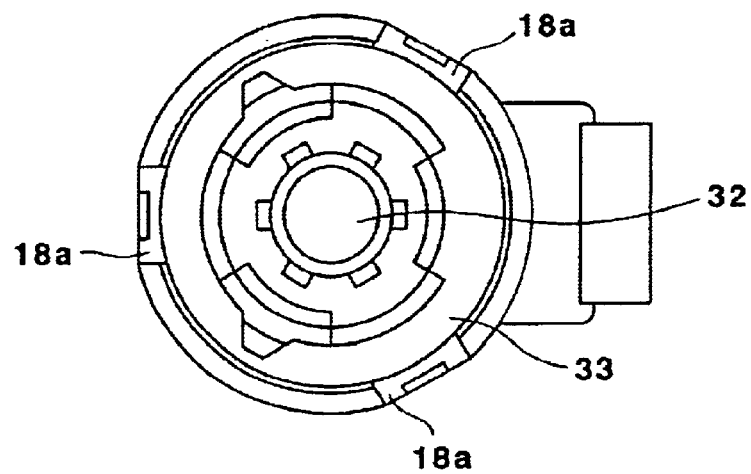
FIG. 2A shows a top plan view of the entire structure of a linear type actuator using a PM stepping motor according to the present invention.
Figure 2B:
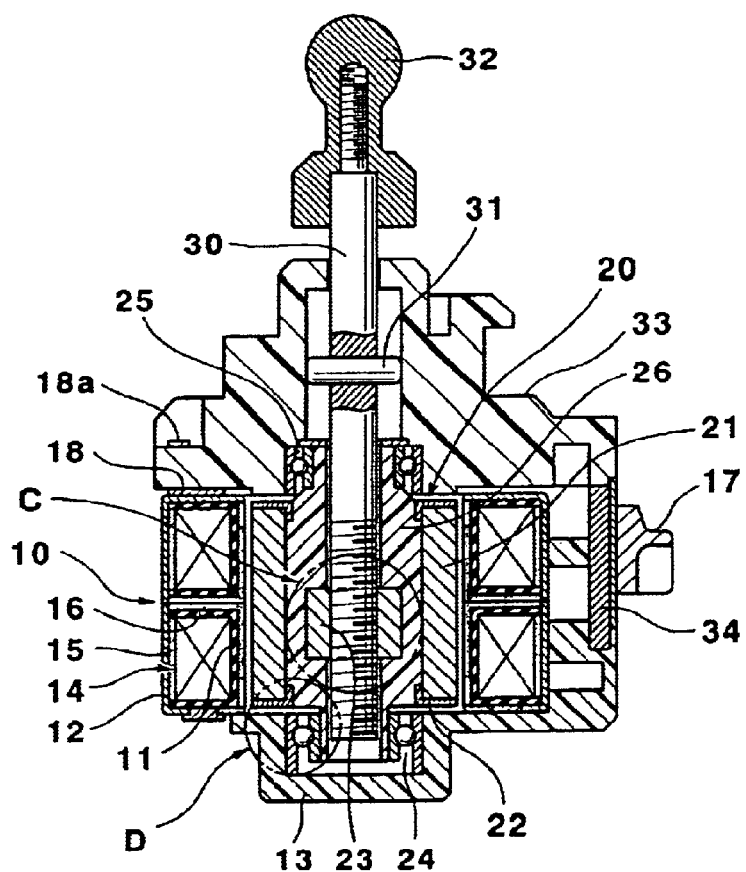
FIG. 2B shows a longitudinal sectional view of the linear type actuator shown in FIG. 2A.

FIG. 2A shows a top plan view of the entire structure of a linear type actuator using a PM stepping motor according to the present invention, and FIG. 2B shows a longitudinal sectional view of the linear type actuator shown FIG. 2A taken along line A—A.

A stator unit 10 comprises two stator sub-assemblies 12 attached to each other in a back to back manner to form two layer construction and integrally molded with a resin material. Each stator sub-assembly 12 is constructed by two kinds of stator yokes formed of a soft magnetic steel sheet worked by sheet metal processing so as to have pole teeth 11 on the inner circumference and to house a coil 14. In this integral molding process, a rear plate 13 which constitutes one end face of the stator unit 10 and has a bearing in its central portion is formed by a resin material for integration at the same time. Thus, a high coaxial precision with respect to the pole teeth formed on the inner circumference of the stator unit 10 can be secured, thereby reducing the number of processes and parts and at the same time enhancing the precision.

The coils 14 housed inside the stator unit 10 each comprise a bobbin 16 made of a resin material such as PBT (Polybutylene telephthalate) resin and a magnet wire wound thereon, and a cover ring 15 which is dimensioned sufficient to cover the height of the coil 14 is arranged outside the coil 14. The coils 14 are connected to a connector 17 via an intermediary substrate 34, and a pulse drive voltage is applied to the coil 14 through the connector 17.

A rotor unit 20 as a rotating body has a magnet stopper 22 made of a metal plate, arranged on both end faces of the field magnet 21 for preventing the field magnet 21 from dropping and adapted to increase the holding force between the field magnet 21 and the rotor unit 20 and to stabilize the size thereof, and a nut 23 as a converting means arranged in the center thereof and adapted to convert rotary motion into linear motion. The magnet stopper 22 and the nut 23 are insert molded to integrally constitute the rotor unit 20. For the nut 23, a resin material such as PPS (Polyphenylene sulfide) resin containing fluorine having small friction coefficient and high wear resistance is used. Reference numeral 26 designates an insert molded resin portion such as PBT resin, and bearings 24, 25 are provided on both end faces thereof to rotatably hold the rotor unit 20.

Figure 2C:
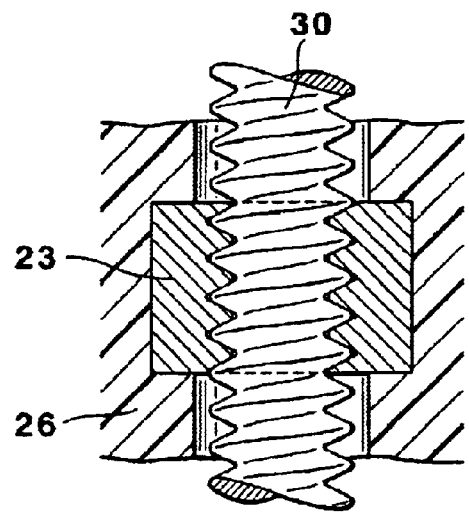
FIGS. 2C and 2D show enlarged views of circled portions C and D of the linear type actuator shown in FIG. 2B, respectively.
Figure 2D:
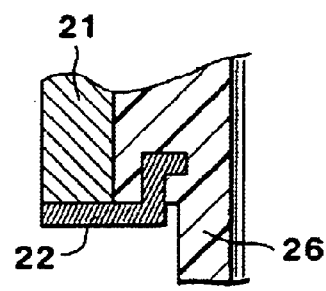

As clearly shown in FIG. 2C, an output shaft 30 with a male screw 62 is arranged in the center of the rotor unit 20 such that the male screw 62 engages with the nut 23. The output shaft 30 has antirotation pin 31 in the midway thereof and a shaft head 32 provided on a tip end thereof.

A front plate 18 having a pawl 18a on the outer periphery thereof is attached to an end face of the stator unit 1 located on the output shaft side by projection welding.

The rotor unit 20 and the output shaft 30 will be assembled into the stator unit 10 in the following manner. The rotor unit 20 and the output shaft 30 are put into the stator unit 10, then a housing 33 is attached and caulked with the pawl 18a to be fixed. Then the shaft head 32 is attached to the tip end of the output shaft 30, and lubricant is appropriately applied to each sliding portion to prevent decrease in efficiency and at the same time to ensure durability.

Operation of the linear type actuator of the present embodiment is described.

When a pulse drive voltage is applied to the coil 14 through the connector 17, the rotor unit 20 rotates by interaction of the magnetic flux of the coil 14 and the field magnet 21. Although the nut 23 also rotates due to the rotation of the rotor unit 20, the output shaft 30 is prevented from rotating by the antirotation pin 31, so that the output shaft 30 moves only in an axial direction.

Figure 3:
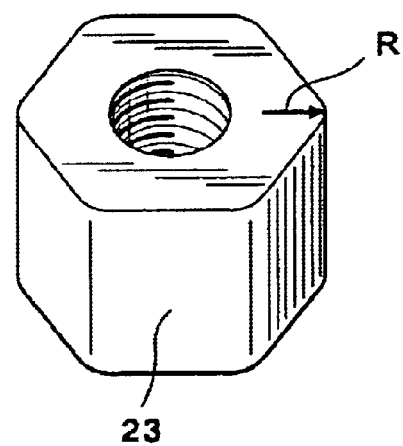
FIG. 3 shows an example of a converting means used in the linear type actuator according to the present invention.

FIG. 3 shows an example of the nut 23 as a converting means used in the present invention.

The nut 23 shown here is a kind of hexagon nut in which roundness is given at each corner so that concentration of stress exerted on the insert molding resin can be avoided. By use of the nut 23 made of an expensive resin material of high quality such as PPS resin containing fluorine, it is possible to use less amount of such resin material of high quality for the major portion of the rotor unit 20.

Figure 4A:
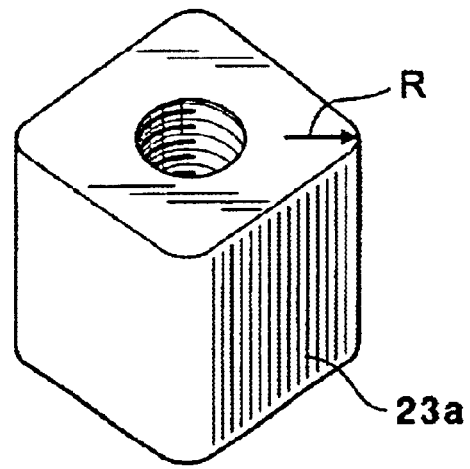
FIGS. 4A, 4B and 4C show other examples of the converting means proposed in the present invention.
Figure 4B:
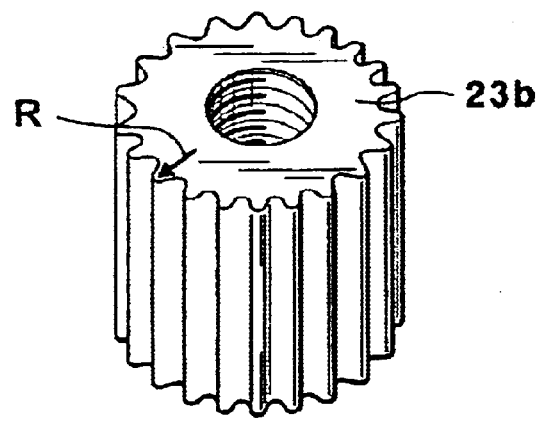
Figure 4C:
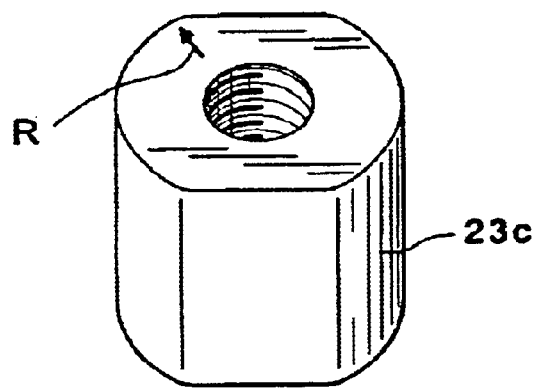

FIG. 4A shows another example 23a of converting means of a quadrangular shape, FIG. 4B shows still another example 23b of converting means of a spline-shape and FIG. 4C shows a further example 23c of converting means of a cylindrical shape having plane cross sections. In these examples, roundness is given at each corner. It is to be noted that these shapes of the converting means are merely examples and are not limitative.

As described above, in the linear type actuator of the present invention, a nut or converting means is made of a resin material having small coefficient of friction, high wear resistance and excellent dimensional stability, and is provided with a shape, for example, hexagon which is effective for prevention of rotation. The nut is insert molded together with a field magnet using an inexpensive resin material to constitute a rotor unit. In this insert molding process, a female screw is not formed, so its die structure is simple and processing time is short.

Therefore, in the linear type actuator of the present invention, cost can be reduced through reduction in material cost and improvement of productivity.

Since a material of the insert molding resin of the conventional rotor unit 50 is different from a resin material of a stator unit 10, both resin materials are different in expansion coefficient from each other thereby limiting the working temperature range. With the linear type actuator of the present invention, resin materials having the same characteristic can be employed, so that the quality of the resin materials can be stabilized.

In the embodiment described above, the nut 23 has been molded by a resin material whose coefficient of friction is small and whose wear resistance is high, but any kind of nuts on the market can be employed.

According to the present invention, in a linear type actuator comprising: a stator unit having coils consisting of wound magnet wires and housed inside stator subassemblies and pole teeth arranged on the inner circumference thereof; a rotor unit having a field magnet arranged on the outer circumference thereof and rotatably disposed so as to oppose the pole teeth with a given gap therebetween; an output shaft attached to a center portion of the rotor unit and movable in the axial direction thereof; and converting means provided on the innermost diametral circumferential surface of the rotor unit and adapted to convert rotary motion of the rotor unit into linear motion of the output shaft, the converting means is made of a material different from that of the rotor unit. Thus, the cost can be reduced through a reduction in the material cost and an improvement of the productivity.

The nut used in the present invention is configured with a plurality of straight sides and has corners thereof rounded, whereby stress concentration due to contraction of the molded material is hard to occur. Therefore the nut has an antirotation function, so that appropriate insert molding can be realized.

Since the rotor unit is integrally constituted by insert molding the field magnet, magnet stoppers adapted to hold the field magnet and also to protect end corners thereof, and the nut, the rotor unit can be manufactured ensuring stable quality.

What is claimed is:

1. A linear actuator comprising:
    a stator unit having coils obtained by a winding of a magnet wire arranged on a stator yoke, and pole teeth arranged on an inner periphery of the stator unit;
    a rotor unit rotatably disposed in a central portion of said stator unit with a given gap opposing said pole teeth, said rotor unit including a field magnet arranged on an outer periphery of a resin portion made of a resin material and conversion means arranged on a portion of an inner periphery of said resin portion;
    said conversion means being made of a material having a small friction coefficient and sufficient abrasion resistance, and said rotor unit being integrally constituted by insert molding said filed magnet and said conversion means;
    magnet stoppers arranged on both end faces of said field magnet by an insert molding process; and, an output shaft having a screw thread on at least a portion of an outer periphery of said output shaft for engaging with said conversion means, said output shaft disposed in the central portion of said rotor unit so as to be slidable in an axial direction thereof.

2. The linear actuator as set forth in claim 1, wherein said conversion means is configured with a plurality of straight sides and has corners thereof rounded.

3. The linear actuator as set forth in claim 1, wherein said conversion means comprises a hexagon shaped nut.

4. The linear actuator as set forth in claim 1, wherein said conversion means comprises a square shaped nut.

5. The linear actuator as set forth in claim 1, wherein said conversion means comprises a spline shaped nut.

6. A linear actuator, comprising:

a stator unit having coils, obtained by a winding of a magnet wire arranged on a stator yoke, and pole teeth arranged on an inner periphery of the stator unit;

a rotor unit rotatably disposed in a central portion of said stator unit with a given gap opposing said pole teeth, said rotor unit including a field magnet arranged on an outer periphery of a resin portion made of a first resin material and conversion means made of a second resin material arranged on a portion of an inner periphery of said resin portion, wherein said second resin material is different from said first resin material; and;

an output shaft having a screw thread on at least a portion of an outer periphery of said output shaft for engaging with said conversion means, said output shaft disposed in the central portion of said rotor unit so as to be slidable in an axial direction thereof;

wherein said rotor unit is integrally constituted by insert molding said field magnet and said conversion means.

7. The linear actuator as set forth in claim 6, wherein said first resin material comprises polybutylene telephthalate, and said second resin material comprises polyphenylene sulfide.

8. The linear actuator as set forth in claim 6, wherein said conversion means is made of a material having a small friction coefficient and sufficient abrasion resistance.

9. A linear actuator comprising:

a stator unit having coils, obtained by a winding of a magnet wire arranged on a stator yoke, and pole teeth arranged on an inner periphery of the stator unit;

a rotor unit rotatably disposed in a central portion of said stator unit with a given gap opposing said pole teeth, said rotor unit including a field magnet arranged on an outer periphery of a resin portion made of a first resin material and conversion means made of a second resin material arranged on at least a portion of an inner periphery of said resin portion, said second resin material being different from said first resin material;

an output shaft having a screw thread on at least a portion of an outer periphery of said output shaft for engaging with said conversion means, said output shaft disposed in the central portion of said rotor unit so as to be slidable in an axial direction thereof;

said conversion means being made of a material having a small friction coefficient and sufficient abrasion resistance, said rotor unit being integrally constituted by insert molding said field magnet and said conversion means; and magnet stoppers arranged on both end faces of said field magnet by the insert molding process.

10. A linear actuator comprising:

a stator unit having coils, obtained by a winding of a magnet wire arranged on a stator yoke, and pole teeth arranged on an inner periphery of the stator unit and filled with a first resin material therebetween;

a rotor unit rotatably disposed in a central portion of said stator unit with a given gap opposing said pole teeth, said rotor unit including a field magnet arranged on an outer periphery of a resin portion made of a second resin material and conversion means arranged on a portion of an inner periphery of said resin portion, wherein said second resin material is the same as said first resin material;

said conversion means being made of a material having a small friction coefficient and sufficient abrasion resistance, said rotor unit being integrally constituted by insert molding said field magnet and said conversion means; and an output shaft having a screw thread on at least a portion of an outer periphery of said output shaft for engaging with said conversion means, said output shaft disposed in the central portion of said rotor unit so as to be slidable in an axial direction thereof.

11. The linear actuator as set forth in claim 10, wherein said conversion means comprises a nut.

12. The linear actuator as set forth in claim 10, wherein said conversion means comprises a hexagon shaped nut.

13. The linear actuator as set forth in claim 10, wherein said conversion means comprises a square shaped nut.

14. The linear actuator as set forth in claim 10, wherein said conversion means comprises a spline shaped nut.

* * * * *